United States Patent [19]

Kuze

[11] Patent Number: 4,492,603
[45] Date of Patent: Jan. 8, 1985

[54] SEALING MATERIAL

[75] Inventor: Takashi Kuze, Yokohama, Japan

[73] Assignee: Tokyo Shibaura Denki Kabushiki Kaisha, Kawasaki, Japan

[21] Appl. No.: 428,057

[22] Filed: Sep. 29, 1982

[30] Foreign Application Priority Data

Sep. 8, 1982 [JP] Japan ................. 57-155184

[51] Int. Cl.³ .................. B32B 15/04; B32B 15/18
[52] U.S. Cl. .................... 148/31.5; 428/469
[58] Field of Search ........... 148/31.5; 428/469, 472; 75/124; 420/442, 443, 445, 446, 447, 451, 452, 584, 586

[56] References Cited

U.S. PATENT DOCUMENTS 3,184,577 5/1965 Witherell ............... 75/124 FE
3,948,615 4/1976 Gray .................... 420/584

FOREIGN PATENT DOCUMENTS 49-19970 5/1974 Japan.
49-19971 5/1974 Japan.
49-19972 5/1974 Japan.
49-19973 5/1974 Japan.
50-104118 8/1975 Japan.
57-11386 3/1982 Japan.

OTHER PUBLICATIONS

Kubaschewski, O., et al.; *Oxidation of Metals and Alloys* Academic Press; p. 1, (1962).
Stahl–Eisen–Liste (1975).
Taschenbuck der Stahl-Eisen-Werkstoffblatter (1971).

*Primary Examiner*—Michael L. Lewis
*Attorney, Agent, or Firm*—Schwartz, Jeffery, Schwaab, Mack, Blumenthal & Koch

[57] ABSTRACT

Disclosed is a sealing material to be associated with soft glass, which comprises a soft glass-sealing alloy of an iron-nickel-chromium system containing about 40 to 55 wt. % of nickel and about 3 to 8 wt. % of chromium, and an oxide layer formed on the surface thereof and having a sulfur content of not more than 15 ppm and a phosphorus content of not more than 20 ppm.

10 Claims, No Drawings

SEALING MATERIAL

BACKGROUND OF THE INVENTION

This invention relates to a sealing material to be associated with soft glass.

Known sealing materials to be associated with soft glass include an alloy of iron (Fe) - nickel (Ni) - chromium (Cr) system such as 42 Ni - 6 Cr - Fe alloy, an alloy of iron - nickel system such as 48∼52 Ni - Fe alloy and an alloy of iron - chromium system such as 18∼27 Cr - Fe alloy. Of these alloys, the iron - nickel - chromium system alloy has been widely used by virtue of its excellent sealing reliability, etc.

When a sealing material made of the iron - nickel - chromium system alloy and soft glass is sealed or adhered to each other, usually the sealing material is first preoxidized in a wet hydrogen furnace to form an oxide layer on its surface and thereafter it is subjected to the sealing to soft glass. Accordingly, it has been a principal technical problem in the conventional alloy of such system that the adhesion between oxide layer formed by preoxidation treatment and the metal underneath should be improved. To solve such problem, it has been proposed that a small amount of aluminum (Al), silicon (Si), vanadium (V), rare earth metals and/or the like is added to the alloy, thereby improving the property of the oxide layer. Although the adhesion has been thereby improved to a certain extent, there has still been room for improvement to meet the need for attaining a sealing state with higher reliability.

In a body constructed by sealing a sealing material to soft glass, it is preferred that the oxide layer on the surface of a sealing material has a thickness as thin as possible. This is because an oxide layer having a greater thickness is liable to be peeled off due to the inherent fragility of the oxide layer, thereby causing destruction of hermetic sealing (i.e. leak) at the peeled portion, and also it results in a greater glass strain caused by the differences in thermal expansion coefficient between the sealing material and the glass.

It is therefore preferred that the oxide layer is as thin as possible and the layer is usually formed with the thickness of about 0.5 to 5μ. However, if it is attempted to make the oxide layer much thinner in order to attain more preferred sealing effect, there will occur a phenomenon in which the oxide layer is over-oxidized at the time of sealing procedure (i.e. an over-oxidation phenomenon in which oxidation proceeds in abnormal state in part to form a too thick oxide layer) or a phenomenon in which blooming of iron oxide from base alloy takes place, whereby the sealing strength is impared drastically.

The present inventor, has noted that these phenomena are caused by nonuniform strength of the oxide layer per se to be formed by preoxidation treatment, rather than poor adhesion between the oxide layer and the metal underneath.

SUMMARY OF THE INVENTION

It is an object of this invention to provide a sealing material which has an oxide layer of uniformly high strength and free from the above-mentioned disadvantages at the step of sealing even when the oxide layer is made thinner, and which can improve the sealing strength to glass as a whole by minimizing the strain where it is sealed to glass.

According to this invention, there is provided a sealing material for sealing soft glass, which comprises an iron - nickel - chromium system alloy containing about 40 to 55 wt % of nickel, about 3 to 8 wt % of chromium, and the balance principally of iron, and oxide layer formed on the surface thereof and having a sulfur content of not more than 15 ppm and a phosphorus content of not more than 20 ppm.

DETAILED DESCRIPTION OF PREFERRED EMBODIMENTS

It has been found by the present inventor that sealing property is influenced by the contents of sulfur (S) and phosphorus (P) in the oxide layer formed on the surface of the sealing material. The sulfur contained in the oxide layer results in the formation of the compounds having lower melting points such as Ni-S, Cr-S, Fe-S, etc., and the more these compounds are contained, the more seriously the strength of oxide layer is impaired. In addition, it is considered that the over-oxidation phenomenon or the blooming of iron oxide from the metal underneath takes place because these compounds are readily molten by heat during sealing procedure due to their lower melting points. The phosphorus contained in the oxide layer is correlated with the sulfur component to enhance the adverse effect arising from the sulfur. Accordingly, sulfur content in the oxide layer should be not more than 15 ppm and phosphorus content not more than 20 ppm. In order to obtain better sealing effect, the sulfur content and the phosphorus content should preferably be not more than 5 ppm, respectively.

The aforementioned scope of composition for the metal underneath which is the alloy according to this invention has been defined for the following reasons: Nickel (Ni) content of less than about 40 wt % undesirably increases the difference in thermal expansion coefficient between the alloy and the glass. In order to decrease the strain at sealing procedure, which strain can be minimized by raising both flex point of thermal expansion coefficient curve of the alloy obtained and thermal expansion coefficient thereof at a lower temperature, the Ni content should preferably be not less than about 46 wt %. If it exceeds about 55 wt %, the thermal expansion coefficient becomes too high. It should preferably be not more than about 50 wt %. The chromium (Cr) content of less than about 3 wt % lowers thermal expansion coefficient of the alloy, and the same exceeding about 8 wt % results in too high thermal expansion coefficient adversely; both of which are unsuitable for its sealing to glass. Preferably, it should range from about 5 to 7 wt %.

It is useful for the alloy to contain a trace amount of aluminum (Al) in order to make the oxide layer dense and enhance the adhesion between metal underneath and oxide layer. In order to obtain this effect successfully, the aluminum should preferably be contained in an amount of not less than about 0.02 % in terms of % by weight. If it is contained in excess of about 1.5 wt %, flex point of thermal expansion coefficient curve is lowered to increase the strain of the alloy during sealing procedure. More preferably, it should be contained in an amount of from about 0.1 to 0.5 wt %.

Further, the alloy containing rare earth element(s) in an amount of from about 0.001 to 2 wt % can improve the adhesion between metal underneath and oxide layer as in the case of the addition of Al. If it is contained together with Al, synergistic effect with Al is obtainable. The rare earth element mentioned here may include 57th to 71st elements in the periodic table, yttrium (Y) and scandium (Sc). Practically employable is a mish metal containing about 40 wt % or more of cerium (Ce). If the rare earth element is contained in excess of about 2 wt %, processability of the alloy will be impaired and the alloy will become expensive. In such a sense, it should preferably be contained in an amount of about 0.3 wt % or less.

The alloy may further contain about 0.05 to 1.5 wt % of one or more of titanium (Ti), vanadium (V), niobium (Nb), tantulum (Ta) and zirconium (Zr), thereby improving the adhesion between metal underneath and oxide layer. For example, vanadium (V) supresses the growth of needle-like oxide crystals formed on the surface of oxide layer to improve the sealing property of the oxide layer to glass. The oxide layer thus improved is excellent in adhesion thereof to the metal underneath and also brings about advantages that its electric resistance is lowered and spot welding can be readily performed. If the element(s) is/are contained in an amount exceeding about 1.5 wt %, the sealing property will be impaired. In such a sense, the content should preferably be not more than about 0.3 wt %.

The alloy may still further contain about 0.1 to 3 wt % of silicon (Si), thereby improving the adhesion between metal underneath and oxide layer. Namely, the Si forms Si layer between the chromium oxide layer and the metal underneath when preoxidation treatment is performed, thereby improving the adhesion between the oxide layer and the metal underneath. If the Si is contained in an amount exceeding about 3 wt %, flex point of thermal expansion coefficient curve of the alloy is lowered with the result of increase of the strain during sealing procedure.

Oxygen ($O_2$) and nitrogen ($N_2$) which are contained in the alloy give influence to formation and density of oxide layer, and impair the adhesion between metal underneath and oxide layer if either of them is contained in an amount exceeding about 200 ppm.

In a practical use, the alloy further contains manganese (Mn), calcium (Ca) and magnesium (Mg), more specifically, about 0.5 wt % or less of Mn, about 0.1 wt % or less of Ca and about 0.1 wt % or less of Mg, which are added as dioxidizer to be used for producing the alloy.

The sealing material according to this invention can be obtained by subjecting it to a heat treatment in an oxidative atmosphere during steps where the sealing material is being prepared. In general, the sealing material is obtainable according to the following steps. Namely, a step of: dissolution of ingot; hot forging; hot rolling; cold rolling; annealing; (cold rolling and annealing may be repeated several times); fabrication; pickling; and preoxidation. In order to obtain in an advantageous manner the sealing material according to this invention, it is preferable to perform the heat treatment (at temperature of about 500° to 1300° C. for 10 seconds to 60 minutes; more preferably, at about 600° to 1000° C. for 30 seconds to 10 minutes) in an oxidative atmosphere after the fabrication step in the above steps or to perform the same heat treatment after the step of preoxidation. The same object can be attained also by carrying out an annealing step which is performed during the course of cold rolling, in an oxidative atmosphere. Sulfur and phosphorus contained in the surface layer are thus removed in advance. Of the above steps, the annealing step or steps are preferably to be performed in a reductive atmosphere or neutral atmosphere such as dry hydrogen, etc. and at temperature of about 800° to 1000° C. for a period of 10 to 50 minutes, and the pickling step by using hydrochloric acid solution or sulfuric acid solution. The preoxidation is carried out in an atmosphere of a wet hydrogen at temperature of about 1050° to 1250° C. for a period of 10 to 100 minutes.

This invention will be described in more detail by the following Example.

EXAMPLE

Ingot alloys for each of the groups of samples having composition as shown in Table 1 (Sample Group Nos. 1 to 8) were subjected to hot forging, and then to cold rolling to obtain plates having thickness of 1 mm each, which were thereafter annealed to fabricate samples of 30 mm in length and 10 mm in width. Half of these samples were subjected as such to pickling step, but the remaining half thereof were subjected to heat treatment at temperature of 800° C. for five minutes in an oxidative atmosphere, and then to pickling step, followed by preoxidation at temperature of 1100° C. for 20 minutes in an atmosphere of a wet hydrogen having dew point of 10° to 40° C. Thereafter, 1 g of soft glass was placed at the centre of each of the samples, and was sealed thereto at temperature of 1200° C. for a period of five minutes in an atmospheric environment.

TABLE 1

| Sample Group No. | Ni (wt %) | Cr (wt %) | Al (wt %) | $O_2$ (ppm) | $N_2$ (ppm) | MM (wt %) | Y (wt %) | Sc (wt %) | V (wt %) | Si (wt %) | Mn (wt %) | Fe (wt %) |
|---|---|---|---|---|---|---|---|---|---|---|---|---|
| 1 | 42.0 | 5.65 | 0.15 | 220 | 200 | | | | | 0.28 | 0.15 | Bal. |
| 2 | 41.85 | 5.8 | | 220 | 180 | | | | | 0.25 | 0.25 | " |
| 3 | 47.1 | 6.0 | 0.2 | 120 | 120 | | | | | 0.20 | 0.20 | " |
| 4 | 47.2 | 6.0 | 0.15 | 180 | 150 | 0.02* | | | | 0.21 | 0.11 | " |
| 5 | 47.0 | 5.8 | 0.2 | 155 | 180 | | 0.2 | | | 0.25 | 0.25 | " |
| 6 | 46.8 | 6.0 | 0.16 | 175 | 180 | | | 0.2 | | 0.25 | 0.20 | " |
| 7 | 47.5 | 5.6 | 0.15 | 180 | 165 | | | | 0.2 | 0.22 | 0.2 | " |
| 8 | 47.2 | 5.6 | 0.2 | 160 | 190 | | | | | 1.0 | 0.2 | " |

*MM: Misch metal containing 70 wt % of Ce and 30 wt % of La.

As to the glass-sealed samples thus prepared, sulfur content and phosphorus content in the oxide layer were examined. Also examined were the presence or absence of over-oxidation at the sealed plane and the state of blooming of iron oxide on the surface of metal underneath. Further examined were the adhesion between the metal underneath and oxide layer and the sealing property between glass and the metal underneath. Results are shown in Table 2. In Table 2, letter "A" denotes samples on which no oxidation treatment was made, and letter "B" denotes samples on which the oxidation treatment was made. The presence or absence of over-oxidation at the sealed plane was determined according to amount of oxide increased by oxidation treatment.

Over-oxidation was deemed to be "present" when said amount increased by oxidation exceeds 0.5 mg/cm$^2$. The state of blooming of iron oxide was evaluated according to the proportion of blooming area (which is grayish) to the surface area of a sample; symbol "++" denotes the sample showing blooming area proportion of less than 10%; and symbol "+", exceeding 10%. These results were obtained by examining 20 samples for each Sample Group Nos. 1 to 8.

The adhesion and the sealing property were examined by striking with a hammer the glass-sealed samples to destroy them, and remove the glass. A hundred samples for each Sample Group Nos. 1 to 8 were used for these examinations. The adhesion indicates the strength of the attachment between metal underneath and oxide layer; symbol "+++" designates a group of samples in which 95% or more of the samples did not result in separation of the oxide layer from the metal underneath; symbol "++", 80% or more; and symbol "+", less than 80%. As for the sealing property, symbol "+++" indicates a group of samples in which a total number of the samples whose oxide layers were separated from glass by the above shock test and the samples whose oxide layers were separated from the metal underneath by the same test, ranges from 0 to 10%, symbol "++", 10 to 40%; and symbol "+", more than 40%.

TABLE 2

| Sample Group No. | | Sulfur and phosphorus contents in oxide layer (ppm) | | Over-oxidation | Blooming of iron oxide | Adhesion | Sealing property |
| --- | --- | --- | --- | --- | --- | --- | --- |
| | | S | P | | | | |
| 1 | A | 16 | 20 | present | + | ++ | + |
| | B | 10 | 10 | absent | ++ | ++ | ++ |
| 2 | A | 17 | 21 | present | + | + | + |
| | B | 8 | 7 | absent | ++ | ++ | ++ |
| 3 | A | 16 | 20 | present | + | ++ | ++ |
| | B | 4 | 5 | absent | ++ | +++ | +++ |
| 4 | A | 18 | 20 | present | + | ++ | ++ |
| | B | 5 | 5 | absent | ++ | +++ | +++ |
| 5 | A | 16 | 21 | present | + | ++ | ++ |
| | B | 5 | 5 | absent | ++ | +++ | +++ |
| 6 | A | 20 | 24 | present | + | ++ | ++ |
| | B | 5 | 5 | absent | ++ | +++ | +++ |
| 7 | A | 17 | 23 | present | + | ++ | ++ |
| | B | 5 | 5 | absent | ++ | +++ | +++ |
| 8 | A | 18 | 21 | present | + | ++ | ++ |
| | B | 5 | 4 | absent | ++ | +++ | +++ |

As apparent from Table 2, the sealing material according to this invention brings about more favorable sealing effect.

Each of the samples was further subjected to salt water spraying test (spray time: 8 hours) to examine the presence or absence of formation of rust and compare the corrosion-resistance of the samples. It was confirmed that rust was formed slightly on the samples of Sample Group Nos. 1 and 2, and not at all on the samples of Sample Group Nos. 3 to 8, each of which latter contains larger amount of nickel.

Still further, thermal expansion coefficient (at 30° to 400° C.) on each of the samples was examined to find that it was about $96 \sim 97 \times 10^{-7}$ cm/cm/°C. in respect of Sample Group Nos. 1 and 2; and about $101 \sim 103 \times 10^{-7}$ cm/cm/°C. in respect of Sample Group Nos. 3 to 8; Sample Group Nos. 3 to 8 showed less strain appearing on glass during sealing procedure.

As described in the foregoing, it is possible according to the sealing material of this invention to suppress the over-oxidation of oxide layer and the blooming of iron oxide contained in the metal underneath, which are liable to take place during sealing procedure, and thereby to attain stable sealing effect. It therefore becomes possible to make thinner the oxide layer on the surface of the sealing material, thereby enhancing the reliability of the sealing plane.

I claim:

1. A sealing material which comprises a soft glass-sealing alloy of an iron - nickel - chromium system consisting essentially of about 40 to 55% by weight of nickel, about 3 to 8% by weight of chromium, and the balance principally of iron, and an oxide layer formed on the surface thereof by a preoxidation treatment and having a sulfur content of not more than 15 ppm and a phosphorus content of not more than 20 ppm.

2. The sealing material according to claim 1, wherein said sulfur content is not more than 5 ppm and said phosphorus content is not more than 5 ppm.

3. The sealing material according to claim 1, wherein said nickel is contained in an amount of about 46 to 50% by weight and said chromium in an amount of about 5 to 7% by weight.

4. The sealing material according to claim 1, wherein said alloy further contains about 0.02 to 1.5% by weight of aluminum.

5. The sealing material according to claim 1, wherein said alloy further contains about 0.001 to 2% by weight of rare earth element(s).

6. The sealing material according to claim 1, wherein said alloy further contains about 0.05 to 1.5% by weight of one or more of titanium, vanadium, niobium, tantalum and zirconium.

7. The sealing material according to claim 1, wherein said alloy further contains about 0.1 to 3% by weight of silicon.

8. The sealing material according to claim 1, wherein oxygen content and nitrogen content in said alloy are controlled to not more than about 200 ppm, respectively.

9. The sealing material according to claim 1, wherein said sulfur content and phosphorus content are controlled by heating the sealing material at a temperature of about 500° to 1300° C. for a period of 10 seconds to 60 minutes in an oxidative atmosphere, before or after the preoxidation treatment.

10. The sealing material according to claim 9, wherein the heating is carried out at a temperature of about 600° to 1000° C. for a period of 30 seconds to 10 minutes.

* * * * *